Nov. 14, 1961  G. LANGE  3,008,373
LENS SYSTEM FOR A GAUSSIAN PHOTOGRAPHIC OBJECTIVE
Filed Sept. 24, 1958  2 Sheets-Sheet 1

United States Patent Office 3,008,373
Patented Nov. 14, 1961

3,008,373
LENS SYSTEM FOR A GAUSSIAN PHOTO-GRAPHIC OBJECTIVE
Günther Lange, Konigsbronn, Wurttemberg, Germany, assignor to Carl Zeiss, Heidenheim (Brenz), Wurttemberg, Germany
Filed Sept. 24, 1958, Ser. No. 763,148
Claims priority, application Germany Sept. 25, 1957
1 Claim. (Cl. 88—57)

It is known that the components lying in front of the diaphragm of a Gaussian photographic objective (basic objective) may be replaced by a lens system consisting of other components, for the purpose of obtaining an altered photographic objective with greater equivalent focal length but with approximately equal back focal length.

The difficulties arising in the development of systems of this kind grow in proportion to the ratio of the two focal lengths. If for instance the greater focal length is to be about 1.6 times the amount of the focal length of the basic objective, then multi-component systems must be provided if it is desired to obtain good image quality.

The investigations on which the present invention is based have shown that a good compromise between the individual aberrations can be attained if said lens system consists of at least three lens components separated by air spaces, of which at least one air space has the two lens surfaces of the components bounding it concave towards the diaphragm, the radii of each of said bounding surfaces lying between $0.1 \cdot f$ and $0.35 \cdot f$ and the axial separations of its bounding surfaces lying between $0.01 \cdot f$ and $0.10 \cdot f$, wherein the algebraic sum of the refractive powers $(\Delta n/r)$ of the two surfaces bounding the aforesaid air space has negative value and wherein the algebraic sum of the refractive powers of all the surfaces lying in front of this air space has negative value, and the partial system comprising all components lying in front of the said air space has negative focal length while the algebraic sum of the refractive powers of the surfaces lying between the said air space and the diaphragm has positive value wherein furthermore the axial separation between the surface bounding the said air space on the object side and the diaphragm is less than $0.35 \times f$ but greater than $0.02 \times f$ where $f$ signifies the equivalent focal length of the complete objective composed of the said lens system and the components behind the diaphragm of said basic objective including the diaphragm.

Good chromatic correction can be attained by designing the first lens in the shape of a dispersive meniscus lens which turns its concave side towards the diaphragm and shows a $\nu$-value less than 35. It is advisable to cement this first lens to the second, but approximately equal correction can be attained with a narrow air space.

Figure 1:
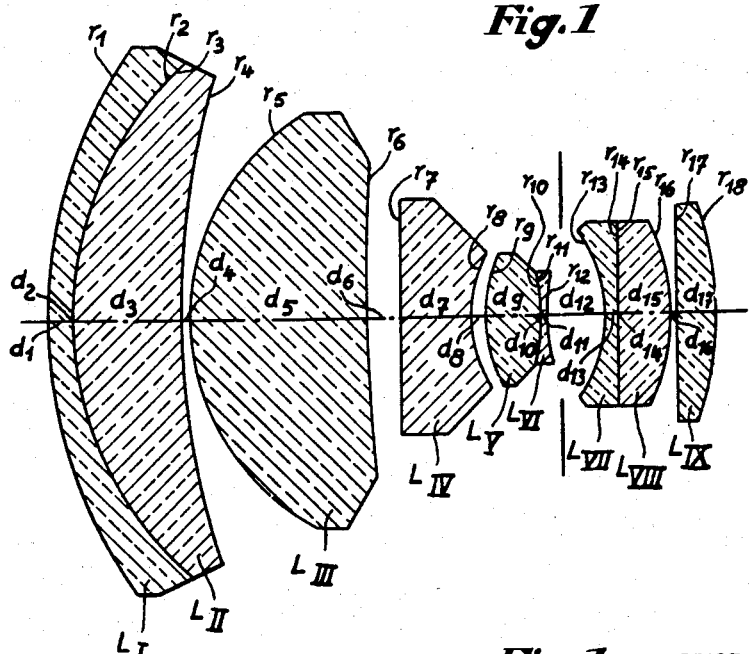
Figure 1A:
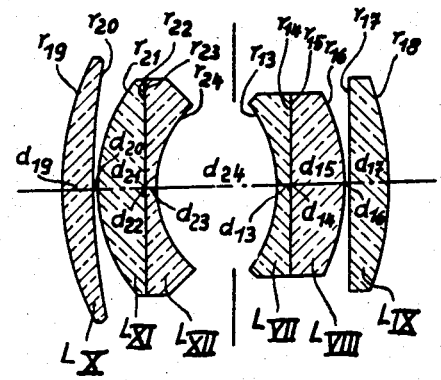
Figure 2:
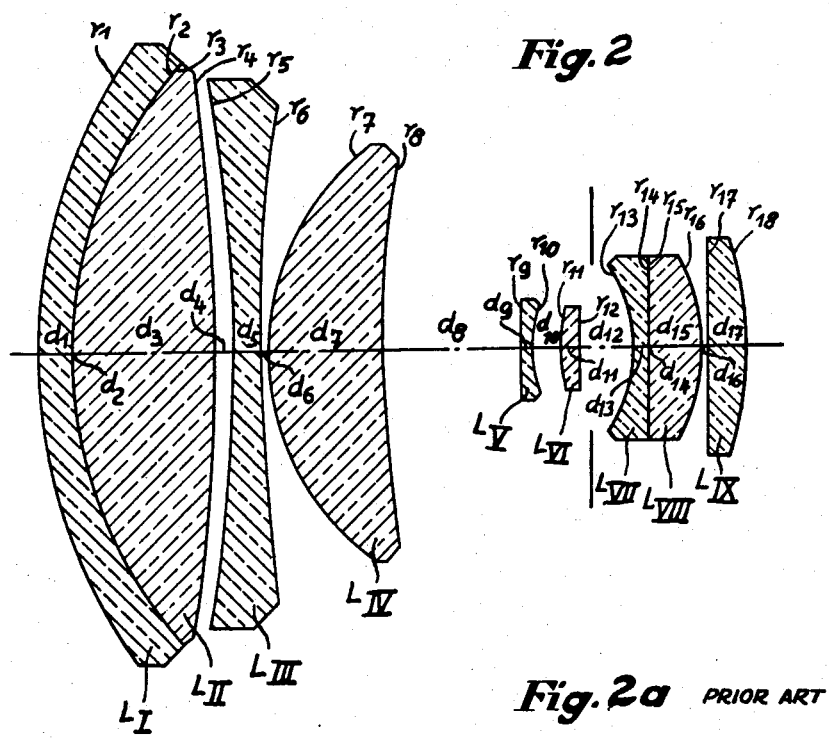
Figure 2A:
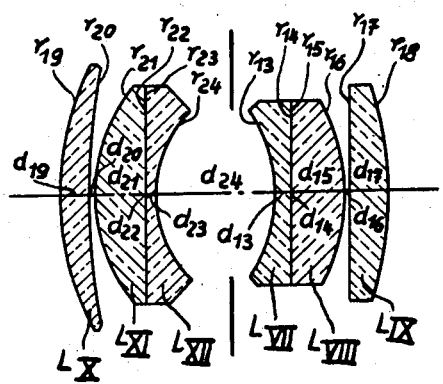

In the following two embodiments are given of objectives which consist of a lens system according to the invention and of the remainder of the basic objective standing behind the diaphragm. The objectives are represented in FIG. 1 and FIG. 2. The basic objective corresponding to each is of prior art and is represented in FIG. 1a and FIG. 2a. In the Table I shown in the following the numerical values are given for the objective according to FIG. 1, in the Table II the numerical values for the objective according to FIG. 2, and in the Table III the numerical values for the basic objective according to FIG. 1a and FIG. 2a.

Therein are designated

By $L_I$ to $L_{XII}$, the lenses
By $r_1$ to $r_{24}$, the radii,
By $d_1$ to $d_{24}$, the axial separations,
By $n_d$, the refractive indices,
By $\nu$, the Abbe numbers,
By $\Delta n/r$, the refractive powers of the individual lens surfaces,
By $s_0'$, the back focal length, and
By O, the aperture of complete objective.

The numerical values are standardised in such a way that for the focal lengths of the objectives according to the invention the value $f=1$ results; this focal length is 1.6 times as large as the focal length of the basic objective.

In the embodiment I it is the air space between lens IV and lens V which shows the characteristics of the invention. In the embodiment II it is the air space between the lens V and lens VI.

Table I (FIG. 1)

$[s_0'=0.42086 \quad f'=1.00 \quad O=1:4]$

| Lenses | Radii | Axial Separations | $n_d$ | $\nu$ | $\Delta n/r$ |
|---|---|---|---|---|---|
| $L_I$ | $r_1 = +0.62553$ | $d_1 = 0.03586$ | 1.80518 | 25.46 | +1.2872 |
|  | $r_2 = +0.44919$ | $d_2 = 0.00000$ |  |  | −1.7925 |
| $L_{II}$ | $r_3 = +0.44919$ | $d_3 = 0.14342$ | 1.59181 | 58.25 | +1.3175 |
|  | $r_4 = +1.09630$ | $d_4 = 0.00120$ |  |  | −0.5398 |
| $L_{III}$ | $r_5 = +0.31346$ | $d_5 = 0.23784$ | 1.46450 | 65.79 | +1.4818 |
|  | $r_6 = +3.27286$ | $d_6 = 0.04260$ |  |  | −0.1419 |
| $L_{IV}$ | $r_7 = +6.62412$ | $d_7 = 0.09322$ | 1.65844 | 50.84 | +0.0994 |
|  | $r_8 = +0.15597$ | $d_8 = 0.01912$ |  |  | −4.2116 |
| $L_V$ | $r_9 = +0.19777$ | $d_9 = 0.07769$ | 1.58267 | 46.46 | +2.9462 |
|  | $r_{10} = -0.23171$ | $d_{10} = 0.00000$ |  |  | +2.5147 |
| $L_{VI}$ | $r_{11} = -0.23171$ | $d_{11} = 0.00956$ | 1.72000 | 50.31 | −3.1073 |
|  | $r_{12} = +0.99123$ | $d_{12} = 0.07350$ |  |  | −0.7264 |
| $L_{VII}$ | $r_{13} = -0.18671$ | $d_{13} = 0.01793$ | 1.72825 | 28.34 | −3.9004 |
|  | $r_{14} = -8.46122$ | $d_{14} = 0.00000$ |  |  | +0.0861 |
| $L_{VIII}$ | $r_{15} = -8.46122$ | $d_{15} = 0.06932$ | 1.74400 | 44.90 | −0.0879 |
|  | $r_{16} = -0.25078$ | $d_{16} = 0.00120$ |  |  | +2.9667 |
| $L_{IX}$ | $r_{17} = +8.34027$ | $d_{17} = 0.05139$ | 1.74400 | 44.90 | +0.0892 |
|  | $r_{18} = -0.46901$ |  |  |  | +1.5863 |

Table II (FIG. 2)

$[s_0'=0.42086 \quad f'=1.00 \quad O=1:4]$

| Lenses | Radii | Axial Separations | $n_d$ | $\nu$ | $\Delta n/r$ |
|---|---|---|---|---|---|
| $L_I$ | $r_1 = +0.70567$ | $d_1 = 0.04384$ | 1.72151 | 29.28 | +1.0224 |
|  | $r_2 = +0.57368$ | $d_2 = 0.00000$ |  |  | −1.2577 |
| $L_{II}$ | $r_3 = +0.57368$ | $d_3 = 0.18525$ | 1.56873 | 63.12 | +0.9914 |
|  | $r_4 = -2.80521$ | $d_4 = 0.02390$ |  |  | +0.2027 |
| $L_{III}$ | $r_5 = -2.13737$ | $d_5 = 0.03586$ | 1.67270 | 32.23 | −0.3147 |
|  | $r_6 = +2.11093$ | $d_6 = 0.00120$ |  |  | −0.3187 |
| $L_{IV}$ | $r_7 = -0.34049$ | $d_7 = 0.14976$ | 1.50013 | 61.59 | +1.4689 |
|  | $r_8 = +1.37287$ | $d_8 = 0.18370$ |  |  | −0.3643 |
| $L_V$ | $r_9 = +3.56775$ | $d_9 = 0.01195$ | 1.74400 | 44.90 | +0.2085 |
|  | $r_{10} = +0.16862$ | $d_{10} = 0.03753$ |  |  | −4.4123 |
| $L_{VI}$ | $r_{11} = +0.24631$ | $d_{11} = 0.02390$ | 1.62536 | 35.57 | +2.5389 |
|  | $r_{12} = +1.11285$ | $d_{12} = 0.07171$ |  |  | −0.5619 |
| $L_{VII}$ | $r_{13} = -0.18671$ | $d_{13} = 0.01793$ | 1.72825 | 28.34 | −3.9004 |
|  | $r_{14} = -8.46122$ | $d_{14} = 0.00000$ |  |  | +0.0861 |
| $L_{VIII}$ | $r_{15} = -8.46122$ | $d_{15} = 0.06932$ | 1.74400 | 44.90 | −0.0879 |
|  | $r_{16} = -0.25078$ | $d_{16} = 0.00120$ |  |  | +2.9667 |
| $L_{IX}$ | $r_{17} = +8.34027$ | $d_{17} = 0.05139$ | 1.74400 | 44.90 | +0.0892 |
|  | $r_{18} = -0.46901$ |  |  |  | +1.5863 |

Table III.—Basic objective (FIGS. 1a and 2a)

| Lenses | Radii | Axial Separations | $n_d$ | $\nu$ |
|---|---|---|---|---|
| $L_X$ | $r_{19}=+0.38342$ | $d_{19}=0.03944$ | 1.74400 | 44.90 |
|  | $r_{20}=+0.87083$ | $d_{20}=0.00120$ |  |  |
| $L_{XI}$ | $r_{21}=+0.22512$ | $d_{21}=0.06693$ | 1.62041 | 60.29 |
|  | $r_{22}=\infty$ | $d_{22}=0.00000$ |  |  |
| $L_{XII}$ | $r_{23}=\infty$ | $d_{23}=0.01315$ | 1.57501 | 41.31 |
|  | $r_{24}=+0.15155$ | $d_{24}=0.15896$ |  |  |
| $L_{VII}$ | $r_{13}=-0.18671$ | $d_{13}=0.01793$ | 1.72825 | 28.34 |
|  | $r_{14}=-8.46122$ | $d_{14}=0.00000$ |  |  |
| $L_{VIII}$ | $r_{15}=-8.46122$ | $d_{15}=0.06932$ | 1.74400 | 44.90 |
|  | $r_{16}=-0.25078$ | $d_{16}=0.00120$ |  |  |
| $L_{IX}$ | $r_{17}=+8.34027$ | $d_{17}=0.05139$ | 1.74400 | 44.90 |
|  | $r_{18}=-0.46901$ |  |  |  |

I claim:

A lens system adapted to replace the components lying in front of the diaphragm of a Gaussian objective (basic objective), said lens system forming in conjunction with the components lying behind the diaphragm of said basic objective and including the diaphragm an altered photographic objective which with approximately equal back focal length has a greater equivalent focal length than said basic objective, said lens system consisting of at least three lens components separated by air spaces, at least one of said air spaces having the two lens surfaces bounding it concave towards the said diaphragm, the radii of each of its bounding surfaces lying between $0.1 \cdot f$ and $0.35 \cdot f$, the axial separation of its bounding surfaces lying between $0.01 \cdot f$ and $0.1 \cdot f$, the algebraic sum of the refractive powers $(\Delta n/r)$ of its bounding surfaces having a negative value, the algebraic sum of the refractive powers of all the surfaces lying in front of the said air space having negative value, the partial system comprising all components lying in front of the said air space having negative focal length, the algebraic sum of the refractive powers of the surfaces lying between the said air space and the diaphragm having positive value, and the axial separation between the surface bounding the said air space on the object side and the diaphragm lying between $0.02 \cdot f$ and $0.35 \cdot f$, where $f$ signifies the equivalent focal length of the complete altered objective composed of the said lens system and the components behind the diaphragm of said basic objective including the diaphragm, the front component of said lens system being a compound component, the front lens element of which is a dispersive meniscus lens concave towards the diaphragm made of a glass having an Abbe-$\nu$-number less than 35.

References Cited in the file of this patent

UNITED STATES PATENTS

| | | |
|---|---|---|
| 2,662,447 | Tronnier | Dec. 15, 1953 |
| 2,780,139 | Lange | Feb. 5, 1957 |
| 2,796,002 | Klemt | June 18, 1957 |
| 2,816,482 | Lange | Dec. 17, 1957 |
| 2,824,493 | Klemt | Feb. 25, 1958 |
| 2,824,494 | Klemt | Feb. 25, 1958 |
| 2,831,396 | Klemt | Apr. 22, 1958 |

FOREIGN PATENTS

| | | |
|---|---|---|
| 472,234 | Germany | Mar. 5, 1929 |
| 1,013,890 | Germany | Aug. 14, 1957 |
| 1,014,753 | Germany | Aug. 29, 1957 |